US009989966B2

(12) United States Patent
Wei et al.

(10) Patent No.: US 9,989,966 B2
(45) Date of Patent: Jun. 5, 2018

(54) INTERSECTION CROSS-WALK NAVIGATION SYSTEM FOR AUTOMATED VEHICLES

(71) Applicant: DELPHI TECHNOLOGIES, INC., Troy, MI (US)

(72) Inventors: Junqing Wei, Bridgeville, PA (US); Wenda Xu, Pittsburgh, PA (US); Jarrod M. Snider, Pittsburgh, PA (US)

(73) Assignee: Delphi Technologies, Inc., Troy, MI (US)

( * ) Notice: Subject to any disclaimer, the term of this patent is extended or adjusted under 35 U.S.C. 154(b) by 116 days.

(21) Appl. No.: 15/160,655

(22) Filed: May 20, 2016

(65) Prior Publication Data
US 2017/0336795 A1    Nov. 23, 2017

(51) Int. Cl.
*G01C 22/00*    (2006.01)
*G05D 1/02*    (2006.01)
*G05D 1/00*    (2006.01)

(52) U.S. Cl.
CPC ......... *G05D 1/0214* (2013.01); *G05D 1/0088* (2013.01); *G05D 1/0223* (2013.01); *G05D 1/0231* (2013.01); *G05D 1/0257* (2013.01)

(58) Field of Classification Search
CPC .. G05D 1/0214; G05D 1/0223; G05D 1/0088; G05D 1/0231; G05D 1/0257
See application file for complete search history.

(56) References Cited

U.S. PATENT DOCUMENTS

| 9,081,383 | B1 | 7/2015 | Montemerlo et al. |
| 9,196,164 | B1 | 11/2015 | Urmson et al. |
| 2005/0273256 | A1* | 12/2005 | Takahashi .......... G01C 21/3632 701/437 |
| 2006/0195257 | A1* | 8/2006 | Nakamura ......... G01C 21/3632 701/437 |
| 2011/0102195 | A1 | 5/2011 | Kushi et al. |
| 2014/0112538 | A1 | 4/2014 | Ogawa et al. |

(Continued)

FOREIGN PATENT DOCUMENTS

WO    2007/053350 A2    5/2007

*Primary Examiner* — Ian Jen
(74) *Attorney, Agent, or Firm* — Lawrence D. Hazelton

(57) ABSTRACT

A crosswalk navigation system for operating an automated vehicle in an intersection includes an intersection-detector, a pedestrian-detector, and a controller. The intersection-detector is suitable for use on a host-vehicle. The intersection-detector is used to determine when the host-vehicle is proximate to an intersection and determine when the intersection includes a cross-walk. The pedestrian-detector is suitable for use on the host-vehicle. The pedestrian-detector is used to determine a motion-vector of a pedestrian relative to the cross-walk. The controller is in communication with the intersection-detector and the pedestrian-detector. The controller is configured to determine a travel-path of the host-vehicle through the intersection, determine when the pedestrian will pass through an intersect-location where the travel-path intersects the cross-walk based on the motion-vector, and operate the host-vehicle to enter the intersection before the pedestrian passes through the intersect-location and to arrive at the intersect-location after the pedestrian passes through the intersect-location.

3 Claims, 2 Drawing Sheets

(56) References Cited

U.S. PATENT DOCUMENTS

| | | | |
|---|---|---|---|
| 2014/0288810 A1* | 9/2014 | Donovan | G08G 1/0116 701/117 |
| 2015/0134180 A1* | 5/2015 | An | G01C 21/34 701/23 |
| 2015/0336502 A1* | 11/2015 | Hillis | B60Q 1/26 701/23 |
| 2015/0345959 A1* | 12/2015 | Meuleau | G05D 1/0212 701/23 |
| 2016/0161270 A1* | 6/2016 | Okumura | G01C 21/34 701/23 |
| 2016/0161271 A1* | 6/2016 | Okumura | B60W 30/09 701/25 |
| 2016/0176398 A1* | 6/2016 | Prokhorov | B60W 30/09 701/23 |
| 2016/0231746 A1* | 8/2016 | Hazelton | G05D 1/0212 |

* cited by examiner

INTERSECTION CROSS-WALK NAVIGATION SYSTEM FOR AUTOMATED VEHICLES

TECHNICAL FIELD OF INVENTION

This disclosure generally relates to a crosswalk navigation system for operating an automated vehicle, and more particularly relates to a system that operates a host-vehicle to enter the intersection before a pedestrian passes through an intersect-location of the pedestrian route and a travel-path of the host-vehicle, and to arrive at the intersect-location after the pedestrian passes through the intersect-location.

BACKGROUND OF INVENTION

It is known to configure or program an automated vehicle to avoid colliding with a pedestrian using a cross-walk at an intersection. However, unnecessary waiting to proceed by the automated vehicle may cause unnecessary traffic delays for other-vehicles attempting to navigate the intersection.

SUMMARY OF THE INVENTION

In accordance with one embodiment, a crosswalk navigation system for operating an automated vehicle in an intersection is provided. The system includes an intersection-detector, a pedestrian-detector, and a controller. The intersection-detector is suitable for use on a host-vehicle. The intersection-detector is used to determine when the host-vehicle is proximate to an intersection and determine when the intersection includes a cross-walk. The pedestrian-detector is suitable for use on the host-vehicle. The pedestrian-detector is used to determine a motion-vector of a pedestrian relative to the cross-walk. The controller is in communication with the intersection-detector and the pedestrian-detector. The controller is configured to determine a travel-path of the host-vehicle through the intersection, determine when the pedestrian will pass through an intersect-location where the travel-path intersects the cross-walk based on the motion-vector, and operate the host-vehicle to enter the intersection before the pedestrian passes through the intersect-location and to arrive at the intersect-location after the pedestrian passes through the intersect-location.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
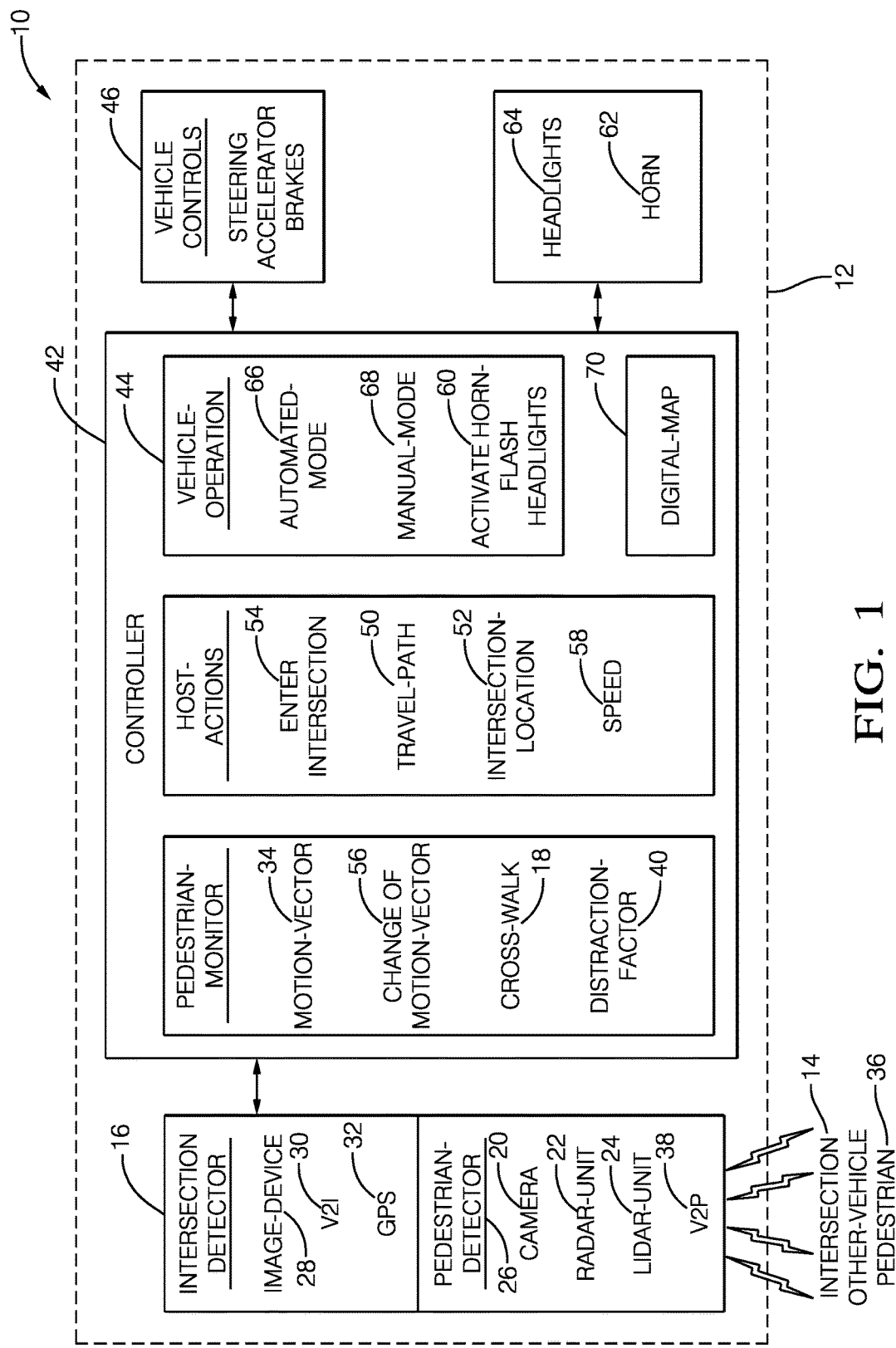
FIG. 1 is a diagram of an intersection cross-walk navigation system in accordance with one embodiment.
Figure 2:
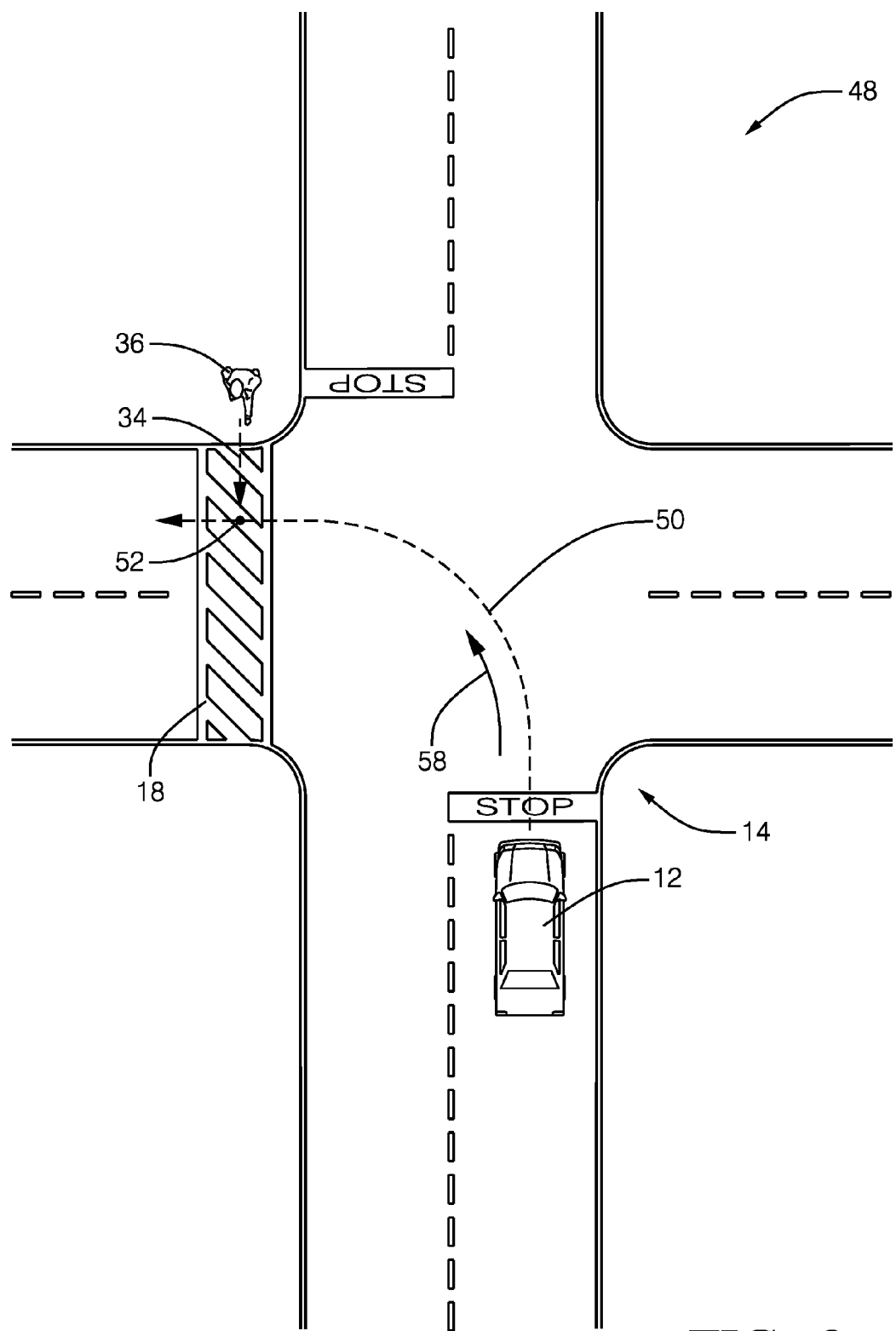
FIG. 2 is a traffic-scenario encountered by the system of FIG. 1 in accordance with one embodiment.

FIG. 1 illustrates a non-limiting example of a crosswalk navigation system 10, hereafter referred to as the system 10, for operating an automated vehicle, for example a host-vehicle 12, in an intersection 14; see also FIG. 2. While the non-limiting examples presented herein are generally directed to fully-automated or autonomous vehicles, it is contemplated that examples of the host-vehicle 12 that are manually operated or driven by a human-operator (not shown), but include the means to temporarily assist the operator, will enjoy comparable benefits from the system 10 described herein.

The system 10 includes an intersection-detector 16 suitable for use on the host-vehicle 12 that, for example, means that the intersection-detector 16 is designed to operate over the ambient temperatures experienced by an automobile. The intersection-detector 16 is generally used by the system 10 to determine when the host-vehicle 12 is proximate to (e.g. stopped at or approaching) the intersection 14, and is generally used by the system 10 determine when the intersection includes a cross-walk 18. By way of example, the function of the intersection-detector 16 may be provided by an image-device 28 such as a camera 20, a radar-unit 22, a lidar-unit 24, or any combination thereof.

While the camera 20, the radar-unit 22, the lidar-unit 24 are shown as being part of a pedestrian-detector 26 which is described in more detail below, it is contemplated that some of the devices suggested in FIG. 1 could be used by both the intersection-detector 16 and the pedestrian-detector 26. Alternatively, or in addition to the image-device 28, the intersection-detector 16 may use vehicle-to-infrastructure-communications (V2I 30), and/or a global-positioning-system-receiver (GPS 32), possibly in combination with a digital-map 70 that may provide information such as the status of a traffic-signal (not shown) that controls traffic in the intersection 14, the size and shape of the intersection 14, and/or indicate the presence of the cross-walk 18.

As suggested above, the system 10 also includes the pedestrian-detector 26 which is also suitable for use on the host-vehicle 12. The pedestrian-detector 26 is generally used to determine a motion-vector 34 of a pedestrian 36 relative to the cross-walk 18. The motion-vector 34 may include, but is not limited to a present-speed, a present-heading, and/or an acceleration-rate associated with motion of the pedestrian 36. The motion-vector 34 may be determined using the camera 20, the radar-unit 22, the lidar-unit 24, or any combination thereof.

Alternatively, or in addition to those devices, vehicle-to-pedestrian-communications (V2P 38) may be used to communicate the motion-vector 34 of the pedestrian 36 to the system. That is, the V2P 38 may provide a location and heading of the pedestrian 36, as will be recognized by those in the art. It is also contemplated that the pedestrian-detector 26 may also determine a distraction-factor 40 of the pedestrian 36 indicative of how distracted the pedestrian 36 may be because, for example, the pedestrian 36 is texting. The distraction-factor 40 may be determined by, for example, using image-analysis of images of the pedestrian 36 captured by the camera 20, or via the V2P 38, as will be recognized by those in the art.

The system includes a controller 42 in communication with the intersection-detector 16 and the pedestrian-detector 26. The controller 42 may include a vehicle-operation block 44 in communication with the vehicle-controls 46 (e.g. steering, acceleration, brakes) so the controller 42 is able to operate (e.g. steer, change-speed, brake) the host-vehicle 12. The controller 42 may include a processor (not specifically shown) such as a microprocessor or other control circuitry such as analog and/or digital control circuitry including an application specific integrated circuit (ASIC) for processing data as should be evident to those in the art. The controller 42 may include memory (not specifically shown), including non-volatile memory, such as electrically erasable programmable read-only memory (EEPROM) for storing one or more routines, thresholds, and captured data. The one or more routines may be executed by the processor to perform steps for determining the presence of the intersection 14 and the pedestrian 36 based on signals received by the controller 42 as described herein.

FIG. 2 illustrates a non-limiting example of a traffic-scenario 48 encountered by the host-vehicle 12 equipped with at least some of aspects of the system 10 described above. In order to enable the system 10 to navigate the traffic-scenario 48, i.e. travel through the intersection 14, the controller 42 is generally configured to determine a travel-path 50 of the host-vehicle 12 through the intersection 14. The determination of the travel-path 50 may include, but is not limited to, determining the arc of the travel-path 50, or determining an acceleration-rate and/or maximum-speed of the host-vehicle 12 through the intersection 14 based on physical dimensions of the intersection 14.

When the presence of the pedestrian 36 is detected, prior examples of automated vehicles will wait until the pedestrian 36 clears the intersection 14 which causes undesirable traffic delays. The system 10 described herein advantageously determines the moment in time or the instant when the pedestrian 36 will pass through an intersect-location 52 where the travel-path 50 intersects the cross-walk 18, and determines the moment in time or the instant when the host-vehicle 12 should enter 54 the intersection 14 so that the host-vehicle 12 arrives at the intersect-location 52 soon after, e.g. two seconds (2 s) after, the pedestrian 36 is enough clear of the intersect-location 52 so the host-vehicle 12 will not collide with the pedestrian 36. That is, the system 10, or more specifically the controller 42 forecasts how long it will take the pedestrian 36 to be clear of the travel-path 50 based on the motion-vector 34, and operates the host-vehicle 12 to enter 54 the intersection 14 before the pedestrian 36 actually passes through the intersect-location 52, and subsequently arrive at the intersect-location 52 soon after the pedestrian 36 passes through the intersect-location 52. By this method of operation, the amount of time wasted is reduced and, in general, traffic flows more efficiently.

It is recognized that the pedestrian 36 may have a change of mind as to the destinations of the pedestrian 36, suddenly stop to respond to a text, or may behave in some unexpected manner that causes a change 56 of the motion-vector 34. If the host-vehicle 12 has already started to enter 54 the intersection 14, the controller 42 may be further configured to adjust a speed 58 of the host-vehicle 12 in response to the change 56 of the motion-vector 34 of the pedestrian 36 that occurs after the host-vehicle 12 enters the intersection 14. It contemplated that the adjustment to the speed 58 may include stopping the host-vehicle 12 in the middle of the intersection 14 if necessary to avoid injury to the pedestrian 36.

If the distraction-factor 40 is deemed to be above some predetermined distraction-threshold, the controller may execute some attention getting action 60 such as activate the horn 62 and/or flash the headlights 64 of the host-vehicle 12 in order to get the attention of the pedestrian 36 to, for example, warn the pedestrian 36 of a the danger of being distracted while walking across the intersection 14.

As suggested above, while the examples presented herein are generally directed to operation of the host-vehicle 12 in an automated-mode 66 where a human-operator (not shown) does little more than designate a destination, it is contemplated that the system 10 will be useful to assist the human-operator while operating the host-vehicle 12 in a manual-mode 68. For example, if the human-operator operates the host-vehicle 12 to enter the intersection 14 and the motion-vector 34 indicates that the pedestrian 36 will not be clear of the intersect-location 52, assuming the human-operator operates the host-vehicle 12 in a manner similar to previously observed instance of the human-operator navigating an intersection; the system 10 may activate a warning-device inside the host-vehicle 12 that notifies the human-operator of the issue.

Accordingly, a crosswalk navigation system (the system 10) for operating an automated vehicle in an intersection 14, a controller 42 for the system 10, and a method of operating the system 10 is provided. Intersection entrance timing is calculated to allow the presence of a pedestrian 36 on a cross-walk 18 that will be crossed by the host-vehicle 12 while proceeding through an intersection 14. Prior examples of automated vehicle wait until crosswalk is clear and is predicted to remain clear during entire turn based on, for example, vector of pedestrian. The improvement is that the host-vehicle can initiate a maneuver (straight ahead or turn) that approaches the cross-walk 18 while the pedestrian 36 is present, but the motion-vector 34 of the pedestrian 36 suggests that the intersect-location on the cross-walk 18 will be clear by the time the host-vehicle 12 arrives at the intersect-location 52.

While this invention has been described in terms of the preferred embodiments thereof, it is not intended to be so limited, but rather only to the extent set forth in the claims that follow.

We claim:

1. A crosswalk navigation system for operating an automated vehicle in an intersection, said system comprising:
    an intersection-detector suitable for use on a host-vehicle, said intersection-detector used to determine when the host-vehicle is proximate to an intersection and determine when the intersection includes a cross-walk;
    a pedestrian-detector suitable for use on the host-vehicle, said pedestrian-detector used to determine a motion-vector of a pedestrian relative to the cross-walk; and
    a controller in communication with the intersection-detector and the pedestrian-detector, said controller configured to determine a travel-path of the host-vehicle through the intersection, determine when the pedestrian will pass through an intersect-location where the travel-path intersects the cross-walk based on the motion-vector, and operate the host-vehicle to enter the intersection before the pedestrian passes through the intersect-location and to arrive at the intersect-location after the pedestrian passes through the intersect-location.

2. The system in accordance with claim 1, wherein the intersection-detector includes one of a digital-map, a camera, a lidar-unit, and a radar-unit.

3. The system in accordance with claim 1, wherein the controller is further configured to adjust a speed of the host-vehicle in response to a change of the motion-vector of the pedestrian that occurs after the host-vehicle enters the intersection.

* * * * *